(No Model.)
L. BELL.
MEANS FOR EXCITING FIELD MAGNETS OF ALTERNATING CURRENT DYNAMOS.
No. 518,217. Patented Apr. 17, 1894.
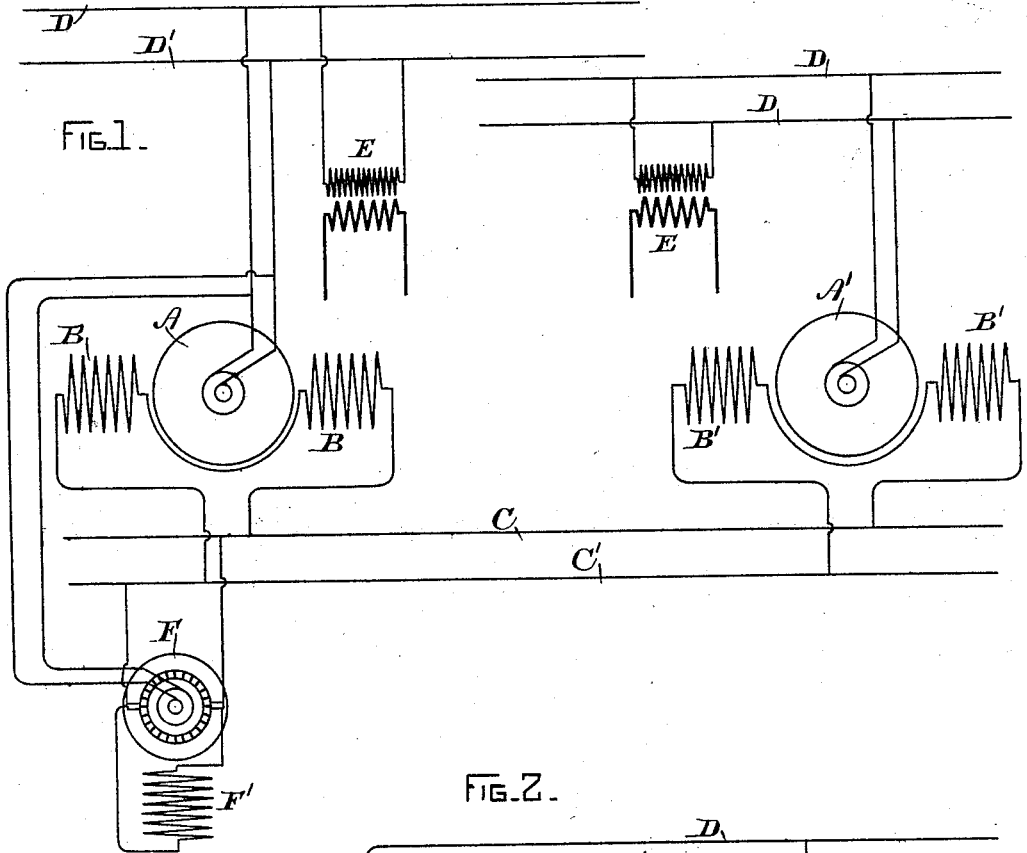
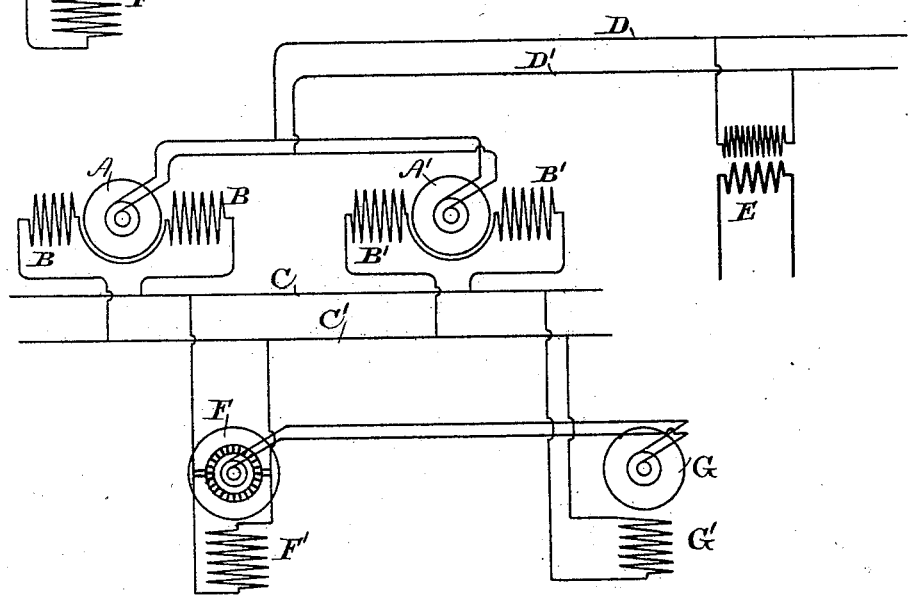
WITNESSES—
A. F. Macdonald.
T. J. Johnston.
INVENTOR—
Louis Bell by
Bentley and Blodgett.
Att'ys.

UNITED STATES PATENT OFFICE.

LOUIS BELL, OF BOSTON, MASSACHUSETTS, ASSIGNOR TO THE GENERAL ELECTRIC COMPANY, OF SAME PLACE.

MEANS FOR EXCITING FIELD-MAGNETS OF ALTERNATING-CURRENT DYNAMOS.

SPECIFICATION forming part of Letters Patent No. 518,217, dated April 17, 1894.

Application filed November 17, 1893. Serial No. 491,192. (No model.)

*To all whom it may concern:*

Be it known that I, LOUIS BELL, a citizen of the United States, residing at Boston, in the county of Suffolk, State of Massachusetts, have invented certain new and useful Improvements in Means for Exciting the Field-Magnets of Alternating-Current Dynamos, of which the following is a specification.

My invention relates to means for and methods of exciting the field magnets of alternating current dynamos; and has for its object to provide an effective means of employing for the purpose a continuous current derived from an alternating current, such a current being capable of accurate regulation and being much more effective for magnet excitation than the ordinary broken or intermittent current produced by the usual rectifying commutator and derived directly from the armature of an alternator. Such a current as the one last described acts only to produce an intermittent magnetic effect, and depends upon the magnetic permanence of the iron in the field-magnet cores acting as a sort of balance-wheel to preserve the magnetism from running down between the impulses of current; it is also more difficult to regulate by reason of its non-continuity, its inductive effect endangers the insulation, and the sparking of a commutator used to commute even a portion of the current derived from a large armature is much greater than that of one used to rectify the entire current delivered from an armature adapted to the purposes of my invention, the suppression of excessive sparking often consuming as much electrical energy as the excitation itself.

To carry out my invention I prefer to use a transforming motor-generator driven by alternating current and generating a continuous current to excite the field-magnets. Such a generator may be driven by a portion of the current derived from the main generator or in some cases it may be fed with alternating current from a separate alternator driven by other power. In both cases my invention contemplates connecting all of the field-magnets of the system when a number of dynamos are used to the armature of the motor generator either by separate leads or by means of bus-bars, so that they are all fed from the same source in an economical manner and with the great efficiency of commutation which is an inherent advantage in motor-generators. One feature of this efficiency is the ease of regulating the alternating side of the system, as pointed out in my pending application hereinafter referred to.

By the term "transforming motor generator," which I employ herein, I intend to include not only a machine which has two armature windings, one supplied with motive alternating currents and the other being the source of generated continuous currents, but also a machine in which there is a single armature winding provided with connections for alternating motive currents and for direct transformed currents, such a machine being generally known as a "rotary transformer."

By the word "continuous," as I employ it in this specification, and particularly in the claims, I mean to distinguish the evenly flowing current supplied by an armature of the ordinary closed circuit type, from the discontinuous or broken current supplied from the commutator attached to the armature of an ordinary alternator and used to commute the whole or a part of its output.

In my pending application, Serial No. 468,765, filed April 3, 1893, I have shown some features of the subject matter of this application, combined with means for regulating the current which I prefer to use; the special features of regulation which may be necessary in this system form the subject of claim in the application referred to.

In the accompanying drawings hereby referred to and made part of this specification I show in diagram an embodiment of my invention, wherein—

Figure 1 is a diagram showing a motor-generator supplied from the main machine, while Fig. 2 is a similar diagram showing a separate alternating current generator as a source of current for the motor-generator.

A, A' are the armatures of the alternating current machine, B, B' their field-magnets, C, C' the bus-bars to which these field-magnets are connected and which supply them with current; D, D' are the mains leading from the alternators to the work, represented by the transformers E, E; F is a transforming motor-generator armature and F' its field-magnet. The same parts are shown in Fig. 2, with the additional feature of an alternating current machine, the armature of which is shown at G and its field-magnet at G'. All of these parts are old and in common use in the art, and it is only their combination and the method embodied therein which form the subject of this application.

In Fig. 1, the armature F of the motor-generator is supplied with alternating current from the mains D, D', leading from the larger alternators, the field-magnets of which it excites. Its own field-magnet F' is also supplied with continuous current, being in shunt to its own brushes. Two alternators are shown taking current for their field-magnets from bus-bars C, C', and having separate circuits leading to the work. In Fig. 2 the same arrangement substantially as shown, except that the main alternators are here connected in multiple, and supply the mains D, D', with the increased current given by this arrangement. The motor-generator field-magnet is excited as in Fig. 1 by part of the current from its own brushes; but its armature F is in this case supplied with current from the alternator G, which may be driven in any suitable manner by separate power, or by a motor which could be supplied with continuous current from the bus-bars C, C', or with alternating current from the mains D, D'. The field-magnet G' of the motor-generator is supplied with continuous current from the bus-bars C, C'. I do not mean, however, to limit myself to the use of bus-bars or other means of supplying machines in multiple, as my invention may be applied to a single machine.

By the arrangement described I get an exceedingly effective method of exciting field-magnets, not liable to the difficulties of the old method pointed out in the statement of invention herein, and one peculiarly applicable to multiphase machines, in which the commutating arrangements are particularly cumbersome. I aim therefore to embrace such multiphase systems in my claims.

What I claim as new, and desire to secure by Letters Patent of the United States, is—

1. In combination, alternating current dynamos, having their field-magnet coils connected to bus-bars, and motor-generators actuated by alternating current and delivering continuous current to the bus-bars.

2. In combination, alternating current dynamos, a motor-generator the field-magnet coils of which are in shunt to its own brushes and which delivers continuous current to the field-magnet coils of the alternators, and a separate alternating machine delivering current to the motor-generator and having its field-magnet coils excited by continuous current therefrom.

3. In combination, alternating current dynamos, having their field-magnet coils connected in a common circuit and motor-generators actuated by alternating current and delivering continuous current to said circuit.

4. In combination, an alternating current dynamo having its field coils supplied with a continuous current from a transforming motor-generator which has an armature winding supplied with alternating motive currents and delivering a constant direct current.

In witness whereof I have hereunto set my hand this 15th day of November, 1893.

LOUIS BELL.

Witnesses:
F. A. DALY,
N. F. HAYES.